(12) United States Patent
Hajare et al.

(10) Patent No.: US 12,265,453 B2
(45) Date of Patent: *Apr. 1, 2025

(54) SNAPSHOT CREATION WITH SYNCHRONOUS REPLICATION

(71) Applicant: NetApp Inc., Sunnyvale, CA (US)

(72) Inventors: Vrishali Dattatray Hajare, Milpitas, CA (US); Ripulkumar Hemantbhai Patel, Fremont, CA (US); Ching-Yuk Paul Ngan, Redwood City, CA (US); Rithin Kumar Shetty, Sunnyvale, CA (US)

(73) Assignee: NetApp, Inc., San Jose, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 17/194,531

(22) Filed: Mar. 8, 2021

(65) Prior Publication Data

US 2021/0191823 A1 Jun. 24, 2021

Related U.S. Application Data

(63) Continuation of application No. 14/980,428, filed on Dec. 28, 2015, now Pat. No. 10,949,309.

(51) Int. Cl.
*G06F 16/27* (2019.01)
*G06F 3/06* (2006.01)
*G06F 11/14* (2006.01)

(52) U.S. Cl.
CPC .......... *G06F 11/1464* (2013.01); *G06F 3/061* (2013.01); *G06F 3/0619* (2013.01); *G06F 3/065* (2013.01); *G06F 3/067* (2013.01); *G06F 16/275* (2019.01); *G06F 2201/84* (2013.01)

(58) Field of Classification Search
CPC .................................................... G06F 16/275
See application file for complete search history.

(56) References Cited

U.S. PATENT DOCUMENTS

| | | | |
|---|---|---|---|
| 8,335,771 B1 | 12/2012 | Natanzon et al. | |
| 8,706,833 B1 * | 4/2014 | Bergant | G06F 16/1756 709/215 |
| 8,745,004 B1 * | 6/2014 | Natanzon | G06F 11/1469 707/634 |
| 8,799,216 B1 | 8/2014 | McCline et al. | |
| 9,087,008 B1 * | 7/2015 | Natanzon | G06F 11/2094 |

(Continued)

*Primary Examiner* — Mohammad S Rostami
(74) *Attorney, Agent, or Firm* — Cooper Legal Group, LLC (57) ABSTRACT

One or more techniques and/or computing devices are provided for snapshot creation. For example, a request may be received to create a snapshot of a first storage object, hosted by a first storage controller, having a synchronous replication relationship with a second storage object hosted by a second storage controller. A coordinator workflow is initialized to issue a drain and hold request to a splitter. Responsive to an indication that the splitter has stopped processing and started queuing incoming write operations and has drained current write operations based upon the drain and hold request, snapshot creation requests are sent to the first storage controller and the second storage controller. Responsive to the first storage controller creating a first snapshot of the first storage object and the second storage controller creating a second snapshot of the second storage object, the splitter may be resumed to process write operations.

20 Claims, 9 Drawing Sheets

(56) References Cited

U.S. PATENT DOCUMENTS

| | | |
|---|---|---|
| 9,135,120 B1* | 9/2015 | Natanzon ............ G06F 11/1456 |
| 9,619,256 B1* | 4/2017 | Natanzon ................ G06F 11/14 |
| 9,740,573 B1 | 8/2017 | Natanzon |
| 9,881,014 B1 | 1/2018 | Bono et al. |
| 10,949,309 B2 | 3/2021 | Hajare et al. |
| 2002/0099811 A1 | 7/2002 | Takeda |
| 2003/0126107 A1 | 7/2003 | Yamagami |
| 2003/0131207 A1 | 7/2003 | Arakawa et al. |
| 2005/0071589 A1 | 3/2005 | Tross et al. |
| 2006/0212465 A1 | 9/2006 | Fish et al. |
| 2007/0022192 A1 | 1/2007 | Nguyen et al. |
| 2008/0297396 A1 | 12/2008 | Dark et al. |
| 2010/0077142 A1 | 3/2010 | Fienblit et al. |
| 2011/0289058 A1 | 11/2011 | Anzai et al. |
| 2012/0259815 A1 | 10/2012 | Olson et al. |
| 2012/0310894 A1 | 12/2012 | Freedman et al. |
| 2013/0007388 A1* | 1/2013 | Kito ........................ G06F 3/065 711/E12.103 |
| 2013/0167145 A1* | 6/2013 | Krishnamurthy ... G06F 9/45558 718/1 |
| 2013/0258882 A1 | 10/2013 | Dinan |
| 2014/0006346 A1* | 1/2014 | Davis ...................... G06F 9/452 707/613 |
| 2014/0081911 A1* | 3/2014 | Deshpande ............. G06F 3/067 707/610 |
| 2014/0129521 A1 | 5/2014 | Marsden |
| 2014/0195480 A1* | 7/2014 | Talagala ............... G06F 16/2365 707/610 |
| 2015/0012571 A1* | 1/2015 | Powell ................... G06F 16/188 707/827 |
| 2015/0089140 A1 | 3/2015 | Sridharan et al. |
| 2015/0186488 A1 | 7/2015 | Fischer et al. |
| 2015/0213032 A1* | 7/2015 | Powell ................... G06F 16/188 707/827 |
| 2015/0234712 A1* | 8/2015 | Fei ........................ G06F 16/184 707/639 |
| 2015/0244795 A1 | 8/2015 | Cantwell et al. |
| 2016/0072888 A1 | 3/2016 | Jung et al. |
| 2016/0224441 A1 | 8/2016 | Arnold et al. |
| 2016/0274974 A1 | 9/2016 | Chen et al. |
| 2016/0274975 A1* | 9/2016 | Chen ...................... G06F 3/0659 |
| 2016/0285716 A1 | 9/2016 | Pelletier et al. |
| 2016/0328168 A1 | 11/2016 | Wei et al. |
| 2016/0374027 A1 | 12/2016 | Dinan |
| 2017/0031994 A1 | 2/2017 | Patterson, III et al. |
| 2017/0060473 A1 | 3/2017 | Fitzhardinge et al. |
| 2017/0064771 A1 | 3/2017 | Manepalli et al. |
| 2017/0163728 A1* | 6/2017 | Chawla ................. G06F 3/0619 |

* cited by examiner

SNAPSHOT CREATION WITH SYNCHRONOUS REPLICATION

RELATED APPLICATIONS

This application claims priority to and is a continuation of U.S. application Ser. No. 14/980,428, filed on Dec. 28, 2015, now allowed, titled "SNAPSHOT CREATION WITH SYNCHRONOUS REPLICATION," which is incorporated herein by reference.

BACKGROUND

Many storage networks may implement data replication and/or other redundancy data access techniques for data loss protection and non-disruptive client access. For example, a first storage cluster may comprise a first storage controller configured to provide clients with primary access to data stored within a first storage device and/or other storage devices. A second storage cluster may comprise a second storage controller configured to provide clients with primary access to data stored within a second storage device and/or other storage devices. The first storage controller and the second storage controller may be configured according to a disaster recovery relationship, such that the second storage controller may provide failover access to replicated data that was replicated from the first storage device to a secondary storage device, owned by the first storage controller, but accessible to the second storage controller (e.g., a switchover operation may be performed where the second storage controller assumes ownership of the secondary storage device and/or other storage devices previously owned by the first storage controller so that the second storage controller may provide clients with failover access to replicated data within such storage devices).

In an example, the second storage cluster may be located at a remote site to the first storage cluster (e.g., storage clusters may be located in different buildings, cities, thousands of kilometers from one another, etc.). Thus, if a disaster occurs at a site of a storage cluster, then a surviving storage cluster may remain unaffected by the disaster (e.g., a power outage of a building hosting the first storage cluster may not affect a second building hosting the second storage cluster in a different city).

In an example, two storage controllers within a storage cluster may be configured according to a high availability configuration, such as where the two storage controllers are locally connected to one another and/or to the same storage devices. In this way, when a storage controller fails, then a high availability partner storage controller can quickly takeover for the failed storage controller due to the local connectivity. Thus, the high availability partner storage controller may provide clients with access to data previously accessible through the failed storage controller.

Various replication and synchronization techniques may be used to replicate data (e.g., client data), configuration data (e.g., a size of a volume, a name of a volume, etc.), and/or write caching data (e.g., cached write operations) between storage controllers and/or storage devices. In an example of synchronization, a synchronous replication relationship may be implemented between the first storage controller and the second storage controller, such that an incoming write operation to the first storage controller is locally implemented upon a first storage object (e.g., a file, a logical unit number (LUN), a LUN spanning multiple volumes, or any other type of object) by the first storage controller and remotely implemented upon a second storage object (e.g., maintained as a backup replication of the first storage object) by the second storage controller before an acknowledgement is provided back to a client that sent the incoming write operation. In an example of replication, snapshots of the first storage object may be used to replicate the first storage object to the second storage object. For example, a base snapshot of the first storage object (e.g., a volume comprising the first storage object) may be used to initially create the second storage object. A current incremental snapshot of the first storage object (e.g., the volume) may be used to replicate changes made to the first storage object since the base snapshot or since a last incremental snapshot. Snapshots may also be periodically created and used to recover from operational failures or corruption. Unfortunately, snapshot creation may be disruptive to client access to the first storage object (e.g., client write requests may be blocked during snapshot creation) and/or may be disruptive to the synchronous replication relationship (e.g., if client write operations are not blocked and are implemented upon the first storage object while a snapshot of the second storage object is being created, then data divergence between the first storage object and the second storage object can occur). For example, client write requests to the first storage object may be rejected during snapshot creation, thus increasing latency and client data access disruption.

DETAILED DESCRIPTION

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for snapshot creation are provided herein. For example, a synchronous replication relationship may exist between a first storage object hosted by a first storage controller and a second storage object hosted by a second storage controller (e.g., a file, a LUN, a LUN stored across multiple volumes, a volume, a subdirectory, or any other object may be synchronously replicated between the storage controllers, such that modifications to the first storage object are replicated to the second storage object before acknowledgements are provided back to clients requesting such modifications). A request to create a snapshot of the first storage object may be locally implemented by the first storage controller upon the first storage object to create a first snapshot available to the first storage controller, and remotely implemented by the second storage controller upon the second storage object (e.g., while the second storage object mirrors the first storage object) to create a second snapshot available to the second storage controller. The snapshots may be created while the synchronous replication relationship is in a synchronous state, which may mitigate resources and/or client data access disruption otherwise caused by having to resync the storage objects. If the first storage controller encounters a failure or disaster, then the second snapshot is readily available for the second storage controller to use to bring applications, at a secondary site hosting the second storage controller, into an up-to-date and operational state with a similar level of functionality that was possible at a primary site hosting the first storage controller before the failure or disaster.

Figure 1:
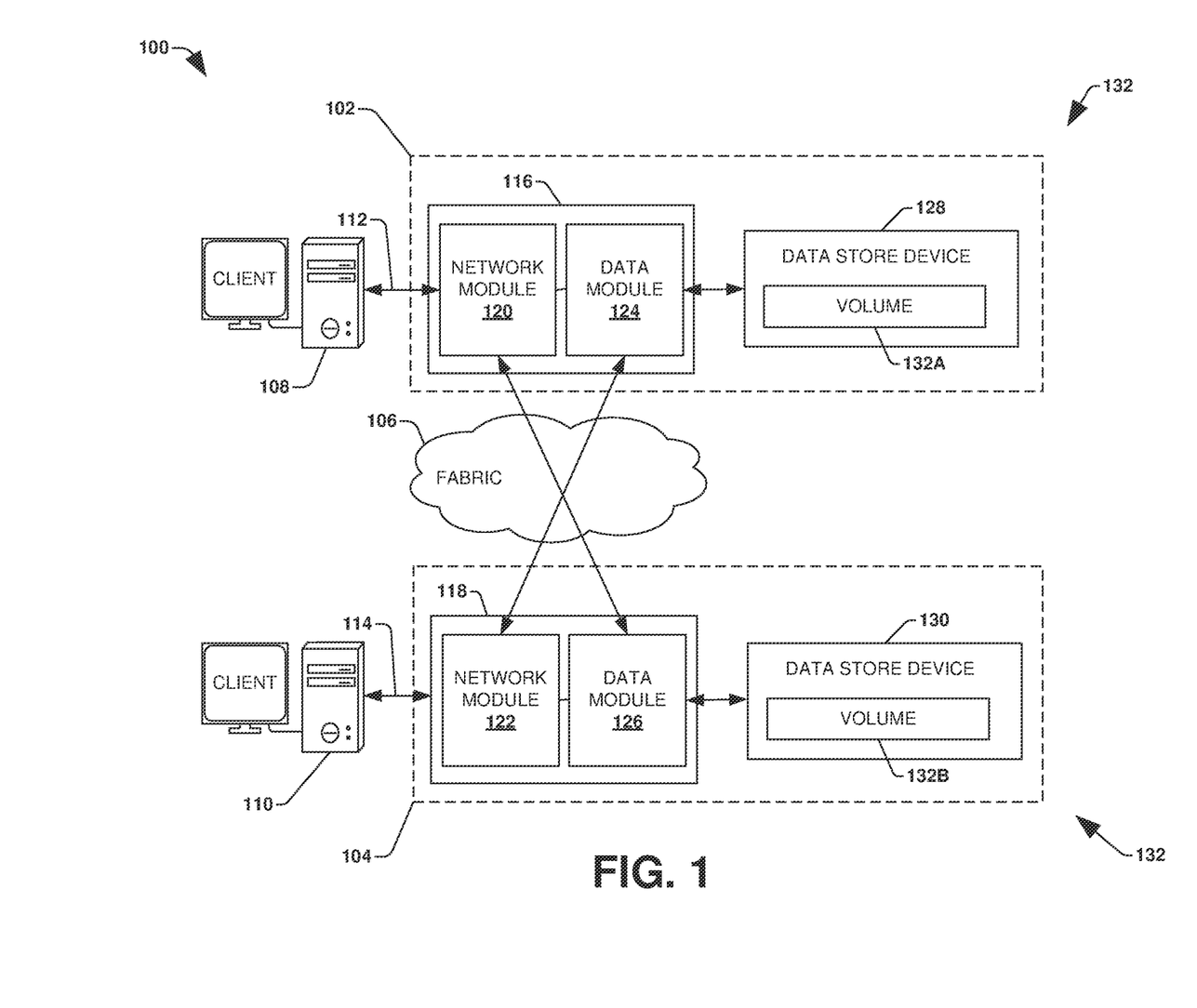
FIG. 1 is a component block diagram illustrating an example clustered network in accordance with one or more of the provisions set forth herein.

To provide context for snapshot creation, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device 130 by sending a request through the data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that snapshot creation may be implemented within the clustered network environment 100. In an example, a synchronous replication relationship may be established between the volume 132A (e.g., or a subset of the volume 132A, such as a file, LUN, subdirectory, or any other type of storage object) of node 116 (e.g., a first storage controller) and the volume 132B (e.g., or a subset of the volume 132B, such as a file, LUN, subdirectory, or any other type of storage object) of the node 118 (e.g., a second storage controller). Responsive to receiving a request to create a snapshot of the volume 132A (e.g., a snapshot of a first storage object within the volume 132A), a first snapshot of the volume 132A may be created by the node 116 and a second snapshot of the volume 132B may be created by the node 118. It may be appreciated that snapshot creation may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
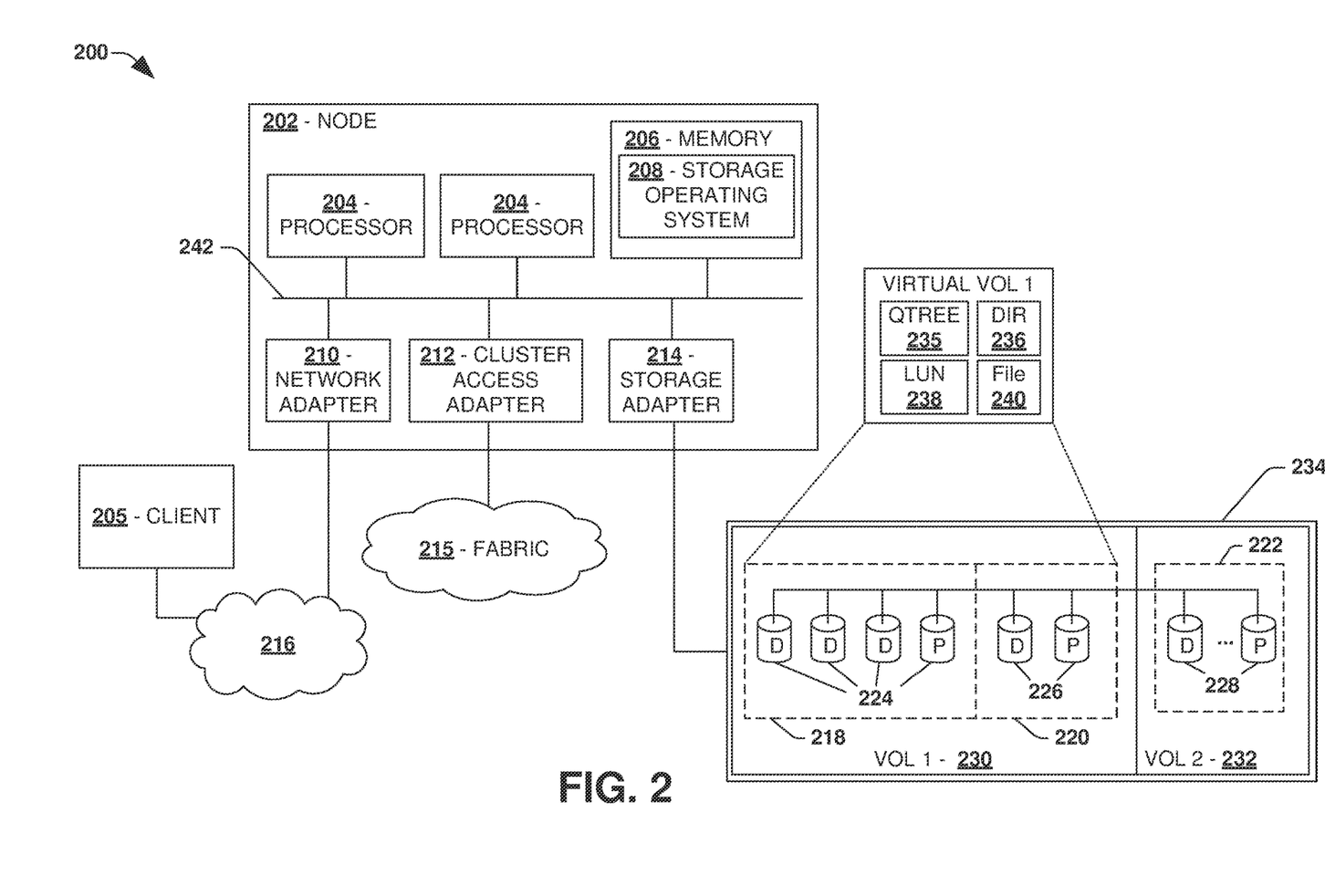
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and network adapters 210, 212, 214 for storing related software application code and data structures. The processors 204 and network adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that snapshot creation may be implemented for the data storage system 200. In an example, a synchronous replication relationship may be established between the volume 230 (e.g., or a subset of the volume 230, such as file 240, LUN 238, subdirectory, or any other type of storage object) of the node 202 (e.g., a first storage controller) and a second volume (e.g., or a subset of the second volume, such as a file, LUN, subdirectory, or any other type of storage object) of a second node (e.g., a second storage controller). Responsive to receiving a request to create a snapshot of the volume 230 (e.g., a snapshot of a first storage object within the volume 230), a first snapshot of the volume 230 may be created by the node 116 and a second snapshot of the second volume may be created by the second node. It may be appreciated that snapshot creation may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
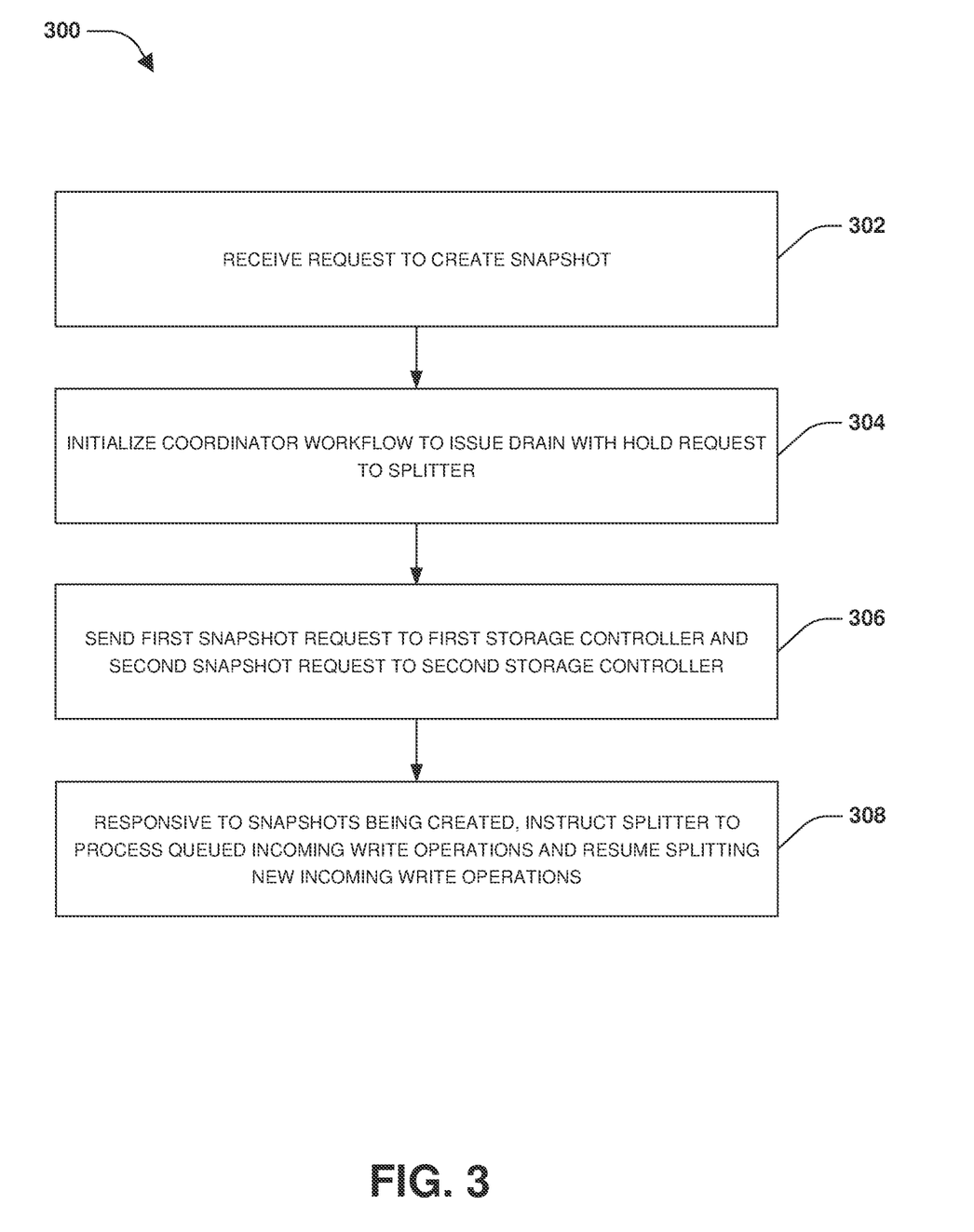
FIG. 3 is a flow chart illustrating an exemplary method of snapshot creation.

One embodiment of snapshot creation is illustrated by an exemplary method 300 of FIG. 3. In an example, a first storage controller may host a first storage object, such as a file, a LUN, a LUN spanning across multiple volumes, a volume, a subdirectory within the volume, or any other type of object used to store data. A second storage controller may host a second storage object that is a backup replication of the first storage object. A synchronous replication relationship may be established between the first storage object and the second storage object, such that a modification to the first storage object (e.g., a write operation from a client) is replicated to the second storage object before an acknowledgement is provided back to the client, thus preserving data consistency between the first storage object and the second storage object.

In an example of the synchronous replication relationship, a modification request (e.g., a write operation) that is received by a data module of the first storage controller is intercepted and checked to see if the modification request is to a file or LUN (e.g., the first storage object) that is part of the synchronous replication relationship. If the modification request is to the file or LUN that is part of the synchronous replication relationship, then the modification request is intercepted and a first copy of the modification request is sent to a primary file system of the first storage controller for implementation, and a second copy of the modification request is sent to the second storage controller for implementation (e.g., implementation upon the second storage object). Once the modification request is completed by both the first storage controller and the second storage controller, then the modification request is acknowledged back to a client that sent the modification request. If the modification request succeeds at the first storage controller but fails at the second storage controller, then the acknowledgment is sent to the client and the synchronous replication relationship is transitioned into an out-of-sync state. Synchronous replication may be provided for a consistency group of files and/or LUNs using multiple splitters, such that a single splitter is used to split modification requests to a particular file or LUN and the splitter tracks a status of ongoing modification requests.

At 302, a request to create a snapshot of the first storage object may be received, such as by the first storage controller hosting the first storage object. A splitter, for the first storage object, is configured to split write operations to target both the first storage object and the second storage object. For example, the splitter may receive a write operation targeting the first storage object. The splitter may split the write operation into a replication write operation. The splitter may instruct the first storage controller to locally implement the write operation upon the first storage object and instruct the second storage controller to remotely implement the replication write operation upon the second storage object.

At 304, a coordinator workflow may be initialized to issue a drain and hold request to the splitter. The drain and hold request may trigger the splitter to stop processing and start queuing incoming write operations, and to drain current write operations (e.g., complete pending write operations received before the drain and hold request was issued). Once the splitter has stopped processing incoming write operations and has drained current write operations, the second storage object may mirror the first storage object (e.g., the storage objects comprise the same data, and thus have data consistency) and a first snapshot request may be sent to (e.g., issued to) the first storage controller to create a first snapshot of the first storage object and a second snapshot request may be sent to the second storage controller to create a second snapshot of the second storage object, at 306. In an example, the first snapshot request and the second snapshot request may be sent in parallel.

In an example, a timer may be started before the start of a drain with hold phase triggered by the drain with hold operation so that the drain with hold phase is not allowed to continue indefinitely. The timer may be used so that incoming write operations are not held up indefinitely in the event an issue occurs without successfully completing the snapshot requests. In an example, a timeout setting of the timer may be configurable through a policy (e.g., an administrator may set the timeout setting). While the timer is active, incoming write operations are queued by the splitter. In an example where the timer times out before the second snapshot is created, the second snapshot request is abandoned. In an example where the timer times out before creation of at least one of the first snapshot or the second snapshot, the second snapshot request is abandoned. In an example where the timer times out before the first snapshot and/or the second snapshot are created, the queued incoming write operations are de-queued and processed upon the first storage object, and the synchronous replication relationship is transitioned into an out-of-sync state. In an example, an administrator may set a policy to have the synchronous replication relationship stay in-sync in case a timeout is encountered.

The first snapshot and the second snapshot may be created while the synchronous replication relationship is in a synchronous state. The first snapshot and the second snapshot may correspond to a common snapshot of a data consistent state between the first storage object and the second storage object (e.g., when the storage objects comprise the same data). Responsive to the first snapshot and the second snapshot being created, the splitter may be instructed to process queued incoming write operations and to resume splitting new incoming write operations.

Various snapshot commands may be synchronously implemented for the first snapshot and the second snapshot. In an example, responsive to receiving a delete snapshot command for the first snapshot, the delete snapshot command, used to delete the first snapshot, and a second delete snapshot command, used to delete the second snapshot, may be synchronously implemented. In an example, responsive to receiving a rename snapshot command for the first snapshot, the rename snapshot command, used to rename the first snapshot, and a second rename snapshot command, used to rename the second snapshot, may be synchronously implemented. In an example, the delete snapshot command and/or the rename snapshot command are synchronous implemented for snapshots at the first storage controller and the second storage controller without performing a drain with hold operation.

Snapshots may be created for a consistency group comprising a plurality of storage objects, such as a plurality of files and/or LUNs. For example, a request may be received to create a snapshot of a first consistency group comprising a first plurality of storage objects, hosted by the first storage controller, having a synchronous replication relationship with a second consistency group comprising a second plurality of storage objects hosted by the second storage controller. A coordinator workflow is initialized to issue drain with hold requests to splitters configured to split write operations to target both storage objects within the first plurality of storage objects and storage objects within the second plurality of storage objects. In an example, each storage object may be associated with its own splitter. For example, a splitter is configured to split a write operation, targeting a first storage object of the first consistency group, into a replication write operation targeting a second storage object, of the second consistency group, that is a backup replication of the first storage object.

Responsive to receiving indications that the splitters (e.g., all of the splitters) have stopped processing and started queuing incoming write operations and have drained current write operations based upon the drain with hold requests, a first snapshot request is sent to (e.g., issued to) the first storage controller to create a first snapshot of the first consistency group and a second snapshot request is sent to the second storage controller to create a second snapshot of the second consistency group. Responsive to the first snapshot and the second snapshot being successfully created, the splitters may be instructed to process queued incoming write operations and to resume splitting new incoming write operations.

Figure 4A:
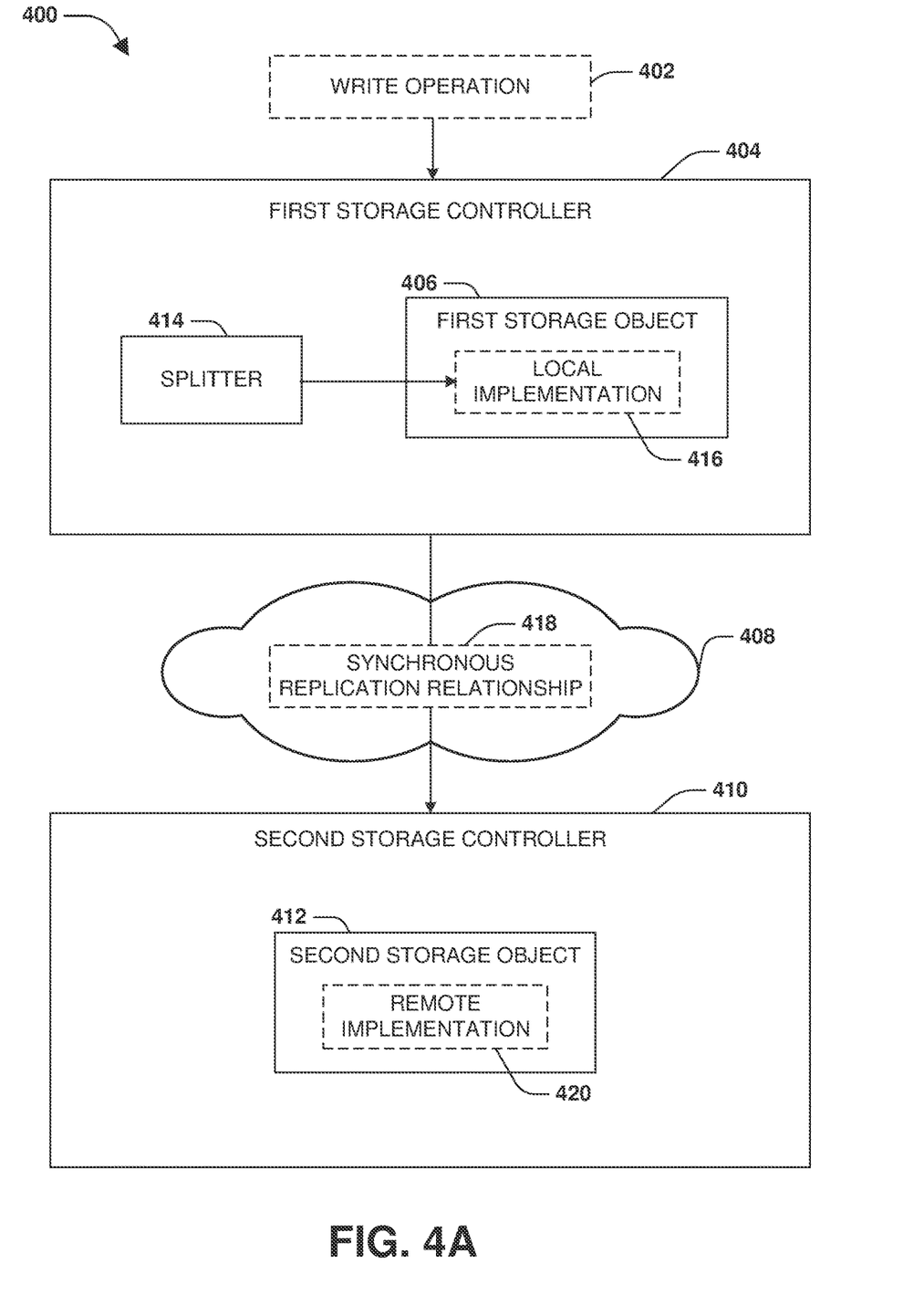
FIG. 4A is a component block diagram illustrating an exemplary computing device for snapshot creation, where a write operation is locally implemented by a first storage controller and remotely implemented by a second storage controller based upon a synchronous replication relationship.

FIGS. 4A-4E illustrate examples of a system 400 for snapshot creation. FIG. 4A illustrates a first storage controller 404 having a synchronous replication relationship 418 with a second storage controller 410. The first storage controller 404 and the second storage controller 410 may be configured to communicate with one another over a network 408. In an example, the synchronous replication relationship 418 may be specified between a first storage object 406 (e.g., a file or LUN within a volume or spanning multiple volumes hosted by the first storage controller 404) and a second storage object 412 (e.g., a file or LUN within a volume or spanning multiple volumes hosted by the second storage controller 410) that is a backup replication of the first storage object 406. Accordingly, a write operation 402, targeting the first storage object 406, may be intercepted. A splitter 414 for the first storage object 406 may locally implement 416 the write operation 402 upon the first storage object 406, and may send a copy of the write operation 402 to the second storage controller 410 for remote implementation 420 upon the second storage object 412. Responsive to both the local implementation 416 and the remote implementation 420 successfully completing, an acknowledgement may be provided back to a client that sent the write operation 402.

Figure 4B:
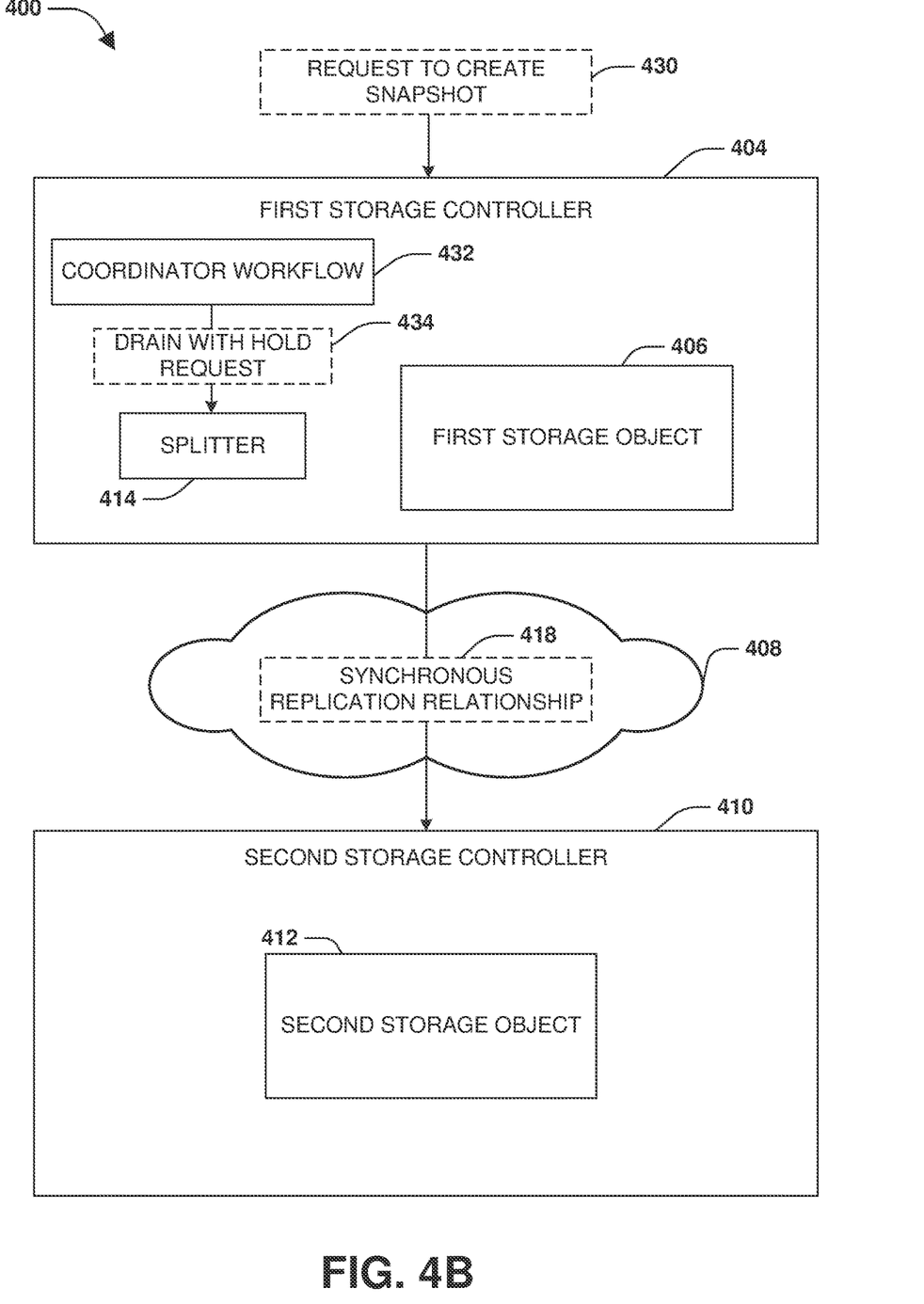
FIG. 4B is a component block diagram illustrating an exemplary computing device for snapshot creation, where a request to create a snapshot is received.
Figure 4C:
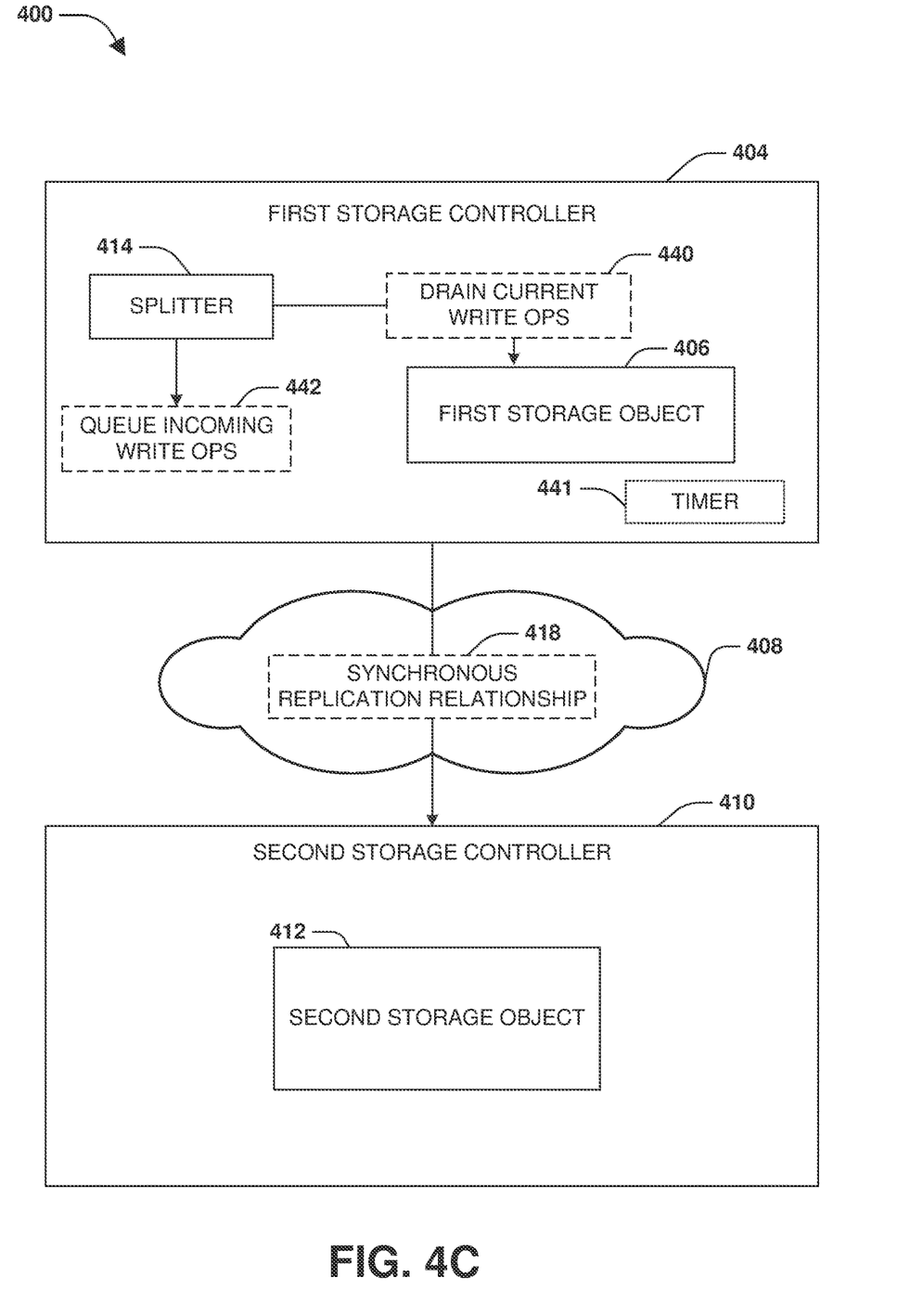
FIG. 4C is a component block diagram illustrating an exemplary computing device for snapshot creation, where a splitter drains current write operations and queues incoming write operations.

FIG. 4B illustrates a request 430, to create a snapshot of the first storage object 406, being received. Accordingly, a coordinator workflow 432 may be initialized to issue a drain with hold request 434 to the splitter 414. The drain with hold request 434 may instruct the splitter 414 to stop processing and queue 442 incoming write operations and to drain (e.g., complete) current write operations 440 to the first storage object 406 and replicated to the second storage object 412, as illustrated in FIG. 4C. In an example, a timer 441 may be started, such as before a drain with hold phase. If the timer 441 times out during draining, then the synchronous replication relationship 418 may be transitioned to an out-of-sync state or may stay in-sync with snapshot creation on the first storage object 406 only.

Figure 4D:
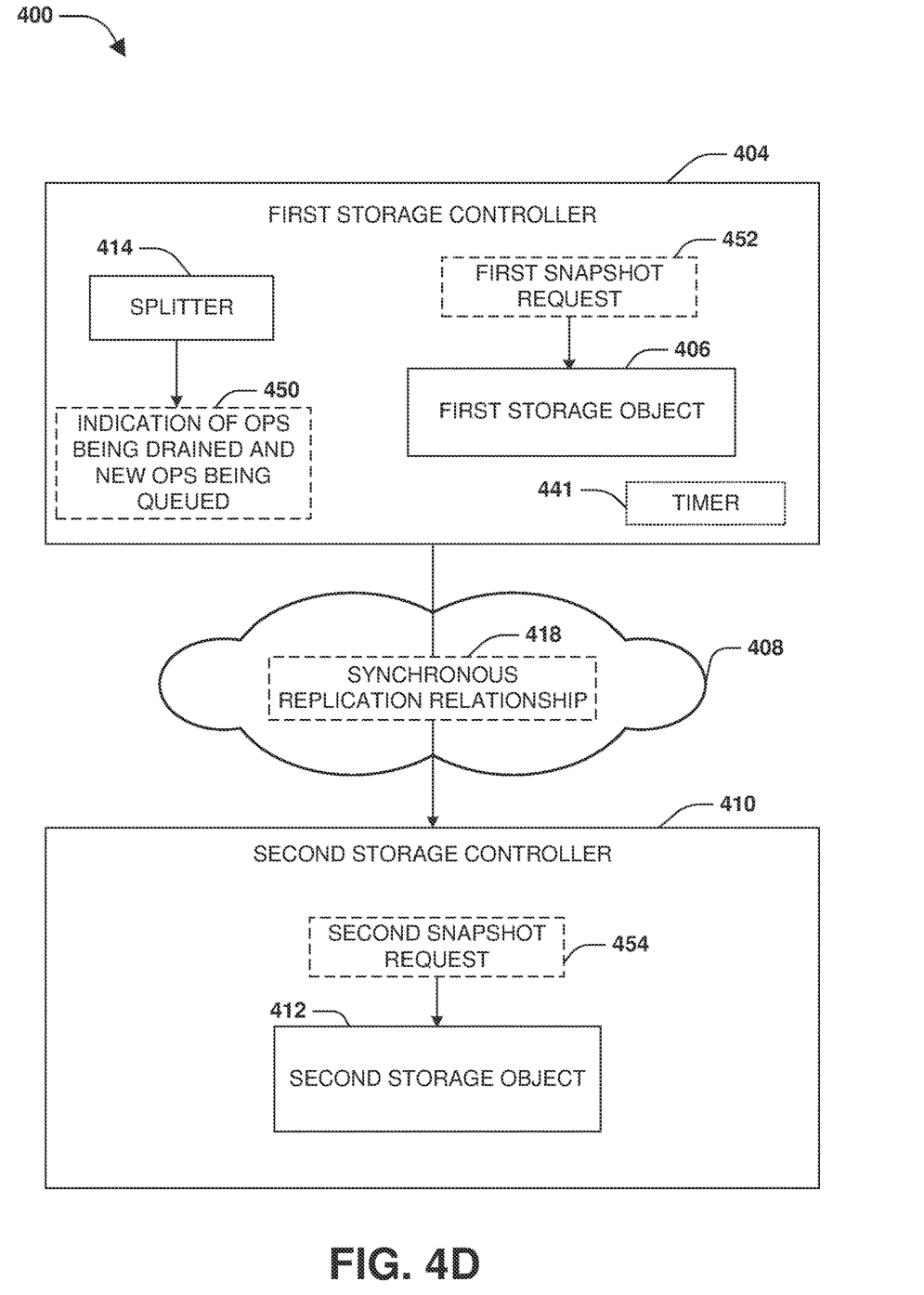
FIG. 4D is a component block diagram illustrating an exemplary computing device for snapshot creation, where a first snapshot request and a second snapshot request are issued.

FIG. 4D illustrates the splitter 414 providing an indication 450 that current write operations have been drained and that incoming write operations are being queued for subsequent processing. Accordingly, a first snapshot request 452 may be sent to (e.g., issued to) the first storage controller 404 to create a first snapshot of the first storage object 406, and a second snapshot request 454 may be sent to the second storage controller 410 to create a second snapshot of the second storage object 412. If the timer 441 times out before the first snapshot and/or the second snapshot are created, then the second snapshot request 454 may be abandoned so that incoming write operations are not held up indefinitely. The replication relationship may be transitioned to an out-of-sync state or stay in-sync, depending on a policy setting.

Figure 4E:
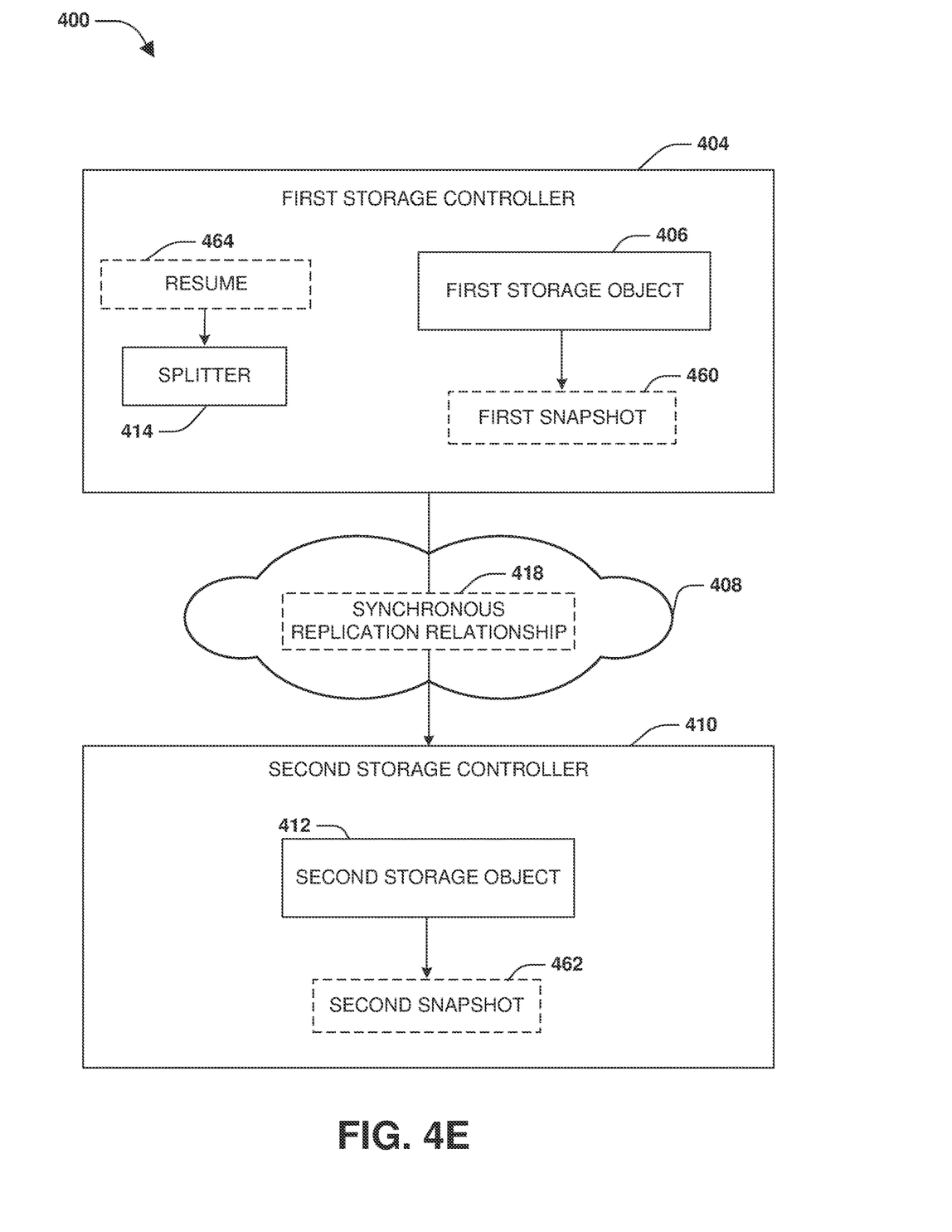
FIG. 4E is a component block diagram illustrating an exemplary computing device for snapshot creation, where a splitter is instructed to resume processing write operations based upon the creation of a first snapshot and a second snapshot.

FIG. 4E illustrates the first snapshot 460 being successfully created and available to the first storage controller 404, and the second snapshot 462 being successfully created and available to the second storage controller 410. In an example, the first snapshot 460 and the second snapshot 462 may correspond to a common snapshot of a data consistent state between the first storage object 406 and the second storage object 412, and thus the second storage controller 410 can use the second snapshot 462 for disaster recovery purposes in the event the first storage controller 404 fails (e.g., responsive to a failover from a first site, comprising the first storage controller 404, to a second site, comprising the second storage controller 410, due to a disaster at the first site, the second storage controller 410 can bring an application into an operational state with a similar level of functionality as was possible on the first site before the failover). Responsive to the first snapshot 460 and the second snapshot 462 being successfully created, the splitter 414 may be instructed 464 to process queued incoming write operations and to resume splitting new incoming write operations.

Figure 5:
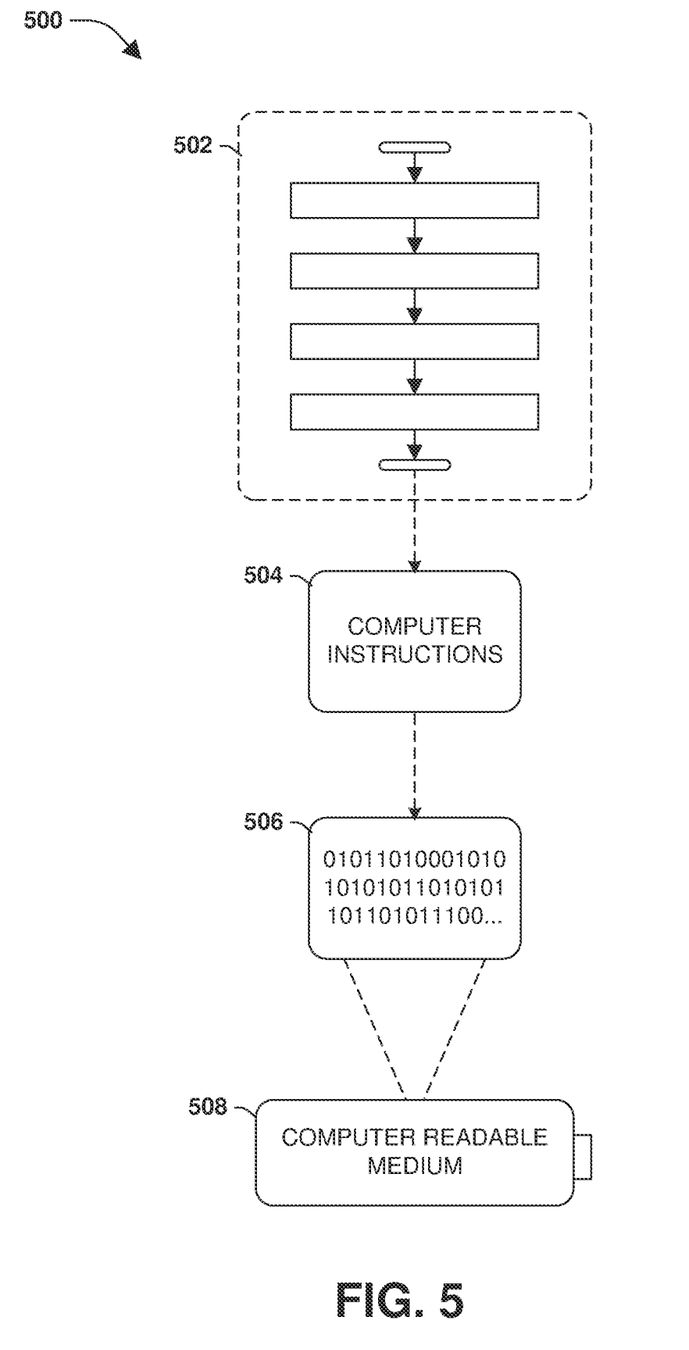
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a CD-R, DVD-R, flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A-4E, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
receiving a request to create a snapshot of a first consistency group, managed by a first node, having a synchronous replication relationship with a second consistency group managed by a second node;
instructing a splitter, assigned to replicate write operations targeting the first consistency group as replicated write operations targeting the second consistency group, to complete replication of pending write operations and queue incoming write operations;
transmitting a first request to the first node to create a first snapshot of the first consistency group and a second request to the second node to create a second snapshot of the second consistency group, wherein creation of the first snapshot of the first consistency group and the second snapshot of the second consistency group is facilitated while the synchronous replication relationship is in a synchronous state where operations are being executed upon the first consistency group and synchronously replicated to the second consistency group;
synchronously implementing a first rename command to rename the first snapshot and a second rename command to rename the second snapshot; and
transmitting an acknowledgement in response to both the first rename command and the second rename command successfully completing to rename both the first snapshot and the second snapshot.

2. The method of claim 1, comprising:
providing an indication that the request to create the snapshot of the first consistency group is successful based upon both the first snapshot of the first consistency group and the second snapshot of the second consistency group successfully completing.

3. The method of claim 1, comprising:
in response to the first snapshot and the second snapshot being successfully created, instructing the splitter to process queued write operations.

4. The method of claim 1, comprising:
maintaining the second consistency group as a backup of the first consistency group based upon the synchronous replication relationship.

5. The method of claim 1, wherein the first consistency group comprises a plurality of logical unit numbers (LUNs) spanning across multiple volumes.

6. The method of claim 1, comprising:
in response to the first snapshot and the second snapshot being successfully created, instructing the splitter to resume replicating subsequently received write operations.

7. The method of claim 1, comprising:
synchronously implementing the first rename command and the second rename command without performing a drain with hold operation where the splitter completes currently pending write operations and stops processing and queues new incoming write operations.

8. The method of claim 1, comprising:
in response to a timer timing out before creation of the first snapshot, transition the synchronous replication relationship to an out-of-sync state based upon a policy setting.

9. The method of claim 1, wherein a storage object within the first consistency group comprises a file.

10. The method of claim 1, wherein a storage object within the first consistency group comprises a logical unit number (LUN).

11. The method of claim 1, comprising:
abandoning creation of the first snapshot based upon a timer timing out.

12. The method of claim 1, comprising:
abandoning creation of the second snapshot based upon a timer timing out.

13. A non-transitory machine readable medium having stored thereon machine executable code which when executed by a machine, causes the machine to:
receive a request to create a snapshot of a first consistency group, managed by a first node, having a synchronous replication relationship with a second consistency group managed by a second node;
instruct a splitter, assigned to replicate write operations targeting the first consistency group as replicated write operations targeting the second consistency group, to complete replication of pending write operations and queue incoming write operations;
transmit a first request to the first node to create a first snapshot of the first consistency group and a second request to the second node to create a second snapshot of the second consistency group, wherein creation of the first snapshot of the first consistency group and the second snapshot of the second consistency group is facilitated while the synchronous replication relationship is in a synchronous state where operations are being executed upon the first consistency group and synchronously replicated to the second consistency group;
synchronously implement a first rename command to rename the first snapshot and a second rename command to rename the second snapshot; and
transmit an acknowledgement in response to both the first rename command and the second rename command successfully completing to rename both the first snapshot and the second snapshot.

14. The non-transitory machine readable medium of claim 13, wherein the machine executable code causes the machine to:
in response to a timer timing out before creation of the first snapshot, transition the synchronous replication relationship to an out-of-sync state based upon a policy setting.

15. The non-transitory machine readable medium of claim 13, wherein the machine executable code causes the machine to:
in response to a timer timing out before creation of the second snapshot, transition the synchronous replication relationship to an out-of-sync state based upon a policy setting.

16. The non-transitory machine readable medium of claim 13, wherein the machine executable code causes the machine to:
in response to a timer timing out before creation of the first snapshot, maintain the synchronous replication relationship in an in-sync state based upon a policy setting.

17. The non-transitory machine readable medium of claim 13, wherein the machine executable code causes the machine to:

in response to a timer timing out before creation of the second snapshot, maintain the synchronous replication relationship in an in-sync state based upon a policy setting.

18. A computing device comprising:
a memory comprising machine executable code; and
a processor coupled to the memory, the processor configured to execute the machine executable code to cause the processor to:
receive a request to create a snapshot of a first consistency group, managed by a first node, having a synchronous replication relationship with a second consistency group managed by a second node;
instruct a splitter, assigned to replicate write operations targeting the first consistency group as replicated write operations targeting the second consistency group, to complete replication of pending write operations and queue incoming write operations;
transmit a first request to the first node to create a first snapshot of the first consistency group and a second request to the second node to create a second snapshot of the second consistency group, wherein creation of the first snapshot of the first consistency group and the second snapshot of the second consistency group is facilitated while the synchronous replication relationship is in a synchronous state where operations are being executed upon the first consistency group and synchronously replicated to the second consistency group;
synchronously implement a first rename command to rename the first snapshot and a second rename command to rename the second snapshot; and
transmit an acknowledgement in response to both the first rename command and the second rename command successfully completing to rename both the first snapshot and the second snapshot.

19. The computing device of claim 18, wherein the machine executable code causes the processor to:
in response to a timer timing out before creation of the first snapshot, transition the synchronous replication relationship to an out-of-sync state based upon a policy setting.

20. The computing device of claim 18, wherein the machine executable code causes the processor to:
in response to a timer timing out before creation of the second snapshot, transition the synchronous replication relationship to an out-of-sync state based upon a policy setting.

* * * * *